United States Patent [19]

Dorr

[11] 3,949,348

[45] Apr. 6, 1976

[54] SONAR APPARATUS

[75] Inventor: John A. Dorr, Crofton, Md.

[73] Assignee: Westinghouse Electric Corporation, Pittsburgh, Pa.

[22] Filed: Oct. 15, 1970

[21] Appl. No.: 80,988

[52] U.S. Cl. .................... 340/8 R; 310/8.2; 310/9.1

[51] Int. Cl.$^2$ .......................................... H04B 13/00

[58] Field of Search .......... 340/8 R, 9, 10, 8 C, 8 D, 340/8 L, 8 FT, 8 MM, 8 LF, 8 A, 8 S, 11, 12, 13; 310/8.2, 9.1–9.4, 26

[56] References Cited

UNITED STATES PATENTS

| | | | |
|---|---|---|---|
| 2,741,754 | 4/1956 | Miller | 340/10 |
| 2,797,399 | 6/1957 | Camp et al. | 340/8 |
| 2,972,068 | 2/1961 | Howry et al. | 310/8.2 |
| 3,113,287 | 12/1963 | Renner | 340/10 X |
| 3,359,537 | 12/1967 | Geil et al. | 340/8 |

*Primary Examiner*—Samuel Feinberg
*Assistant Examiner*—Harold Tudor
*Attorney, Agent, or Firm*—D. Schron

[57] ABSTRACT

A side looking sonar transducer which has sound absorbing material extending forwardly of the active surface of the transducer elements to diminish the acoustic response over a predetermined zone for reducing the effect of erroneous reflection signals.

4 Claims, 5 Drawing Figures

FIG. I.

WITNESSES

Theodore F. Wrobel

James F. Young

INVENTOR

John A. Dorr

BY Dean Schron

ATTORNEY

SONAR APPARATUS

BACKGROUND OF THE INVENTION

1. Field of the Invention:

This invention in general relates to transducers, and particularly to high frequency sonar transducers.

2. Description of the Prior Art:

In general, high frequency sonar beam patterns are determined by the shape of the active surface of the transducer elements used to project or receive the acoustic energy. The most common surfaces are rectangular, circular, or annular.

In order to obtain a specific beam pattern, with these standard shaped elements, complex arrays must be designed, use must be made of amplitude and phase shading, or reflectors must be employed. These techniques are increasingly difficult at higher frequencies and become prohibitively costly.

SUMMARY OF THE INVENTION

The transducer apparatus of the present invention includes transducing means having an active surface for transmitting and/or receiving acoustic energy along an acoustic axis. The transducing means has a certain beam pattern, and acoustic response diminishes relative to the acoustic axis in accordance with the beam pattern.

An acoustic absorbing material having an acoustic impedance substantially equal to the acoustic impedance of the medium in which the transducer apparatus is operating, is positioned about the transducing means and extends forwardly therefrom past the active surface to absorb a portion of acoustic energy projected or received. The positioning of this acoustic absorbing material has the effect of modifying the beam pattern to reduce the off axis response over a predetermined zone forward of the active surface.

DESCRIPTION OF THE PREFERRED EMBODIMENTS

Although the present invention may be utilized in a variety of embodiments, the apparatus will be described with respect to sonar uses and particularly to a side looking sonar device for use on a carrier, e.g., an undersea vessel.

In side-looking sonar systems, an elongated transducer, in response to an electrical signal, projects acoustic energy toward the sea bottom where it impinges upon an extremely narrow area. Acoustic reflections from this narrow area are received by that same, or a similar transducer which converts the acoustic signal back into an electrical signal. Successive transmissions are made as the carrier vessel proceeds along a course line and during which course of travel processing equipment responsive to the electrical signals from the transducer provides a display which portrays a picture of the bottom in accordance with each reflected transmitted signal. The resultant display is similar to a picture on a television screen in that the entire scene is made up of a plurality of parallel sweeps with each sweep being the portrayal of a reflected transmitted signal from an extremely narrow area on the bottom.

Figure 1:
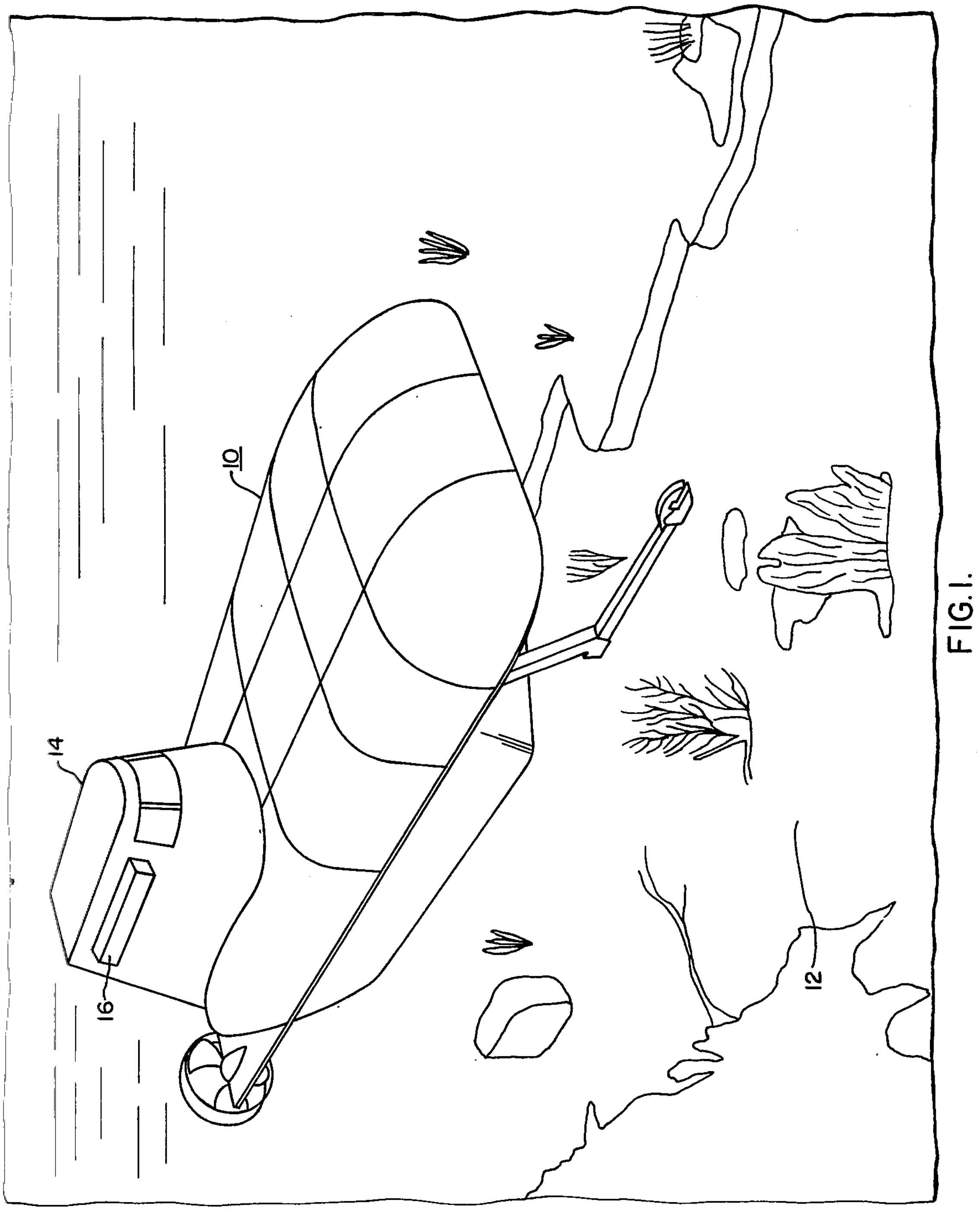
FIG. 1 illustrates the transducer apparatus in a typical undersea environment.

In FIG. 1, there is illustrated an underwater vessel 10 traveling over the bottom 12 of a body of water. Mounted on the conning tower 14 of the vessel 10 is a side-looking sonar transducer 16 which is operative to project acoustic energy laterally of the vessel 10 and to thereafter receive reflected acoustic signals from the bottom 12. For very low speeds of operation, the transducer 16 may include a transducing means which acts as both a transmitter and a receiver, or alternatively for higher speeds of operation a separate transmitting and receiving transducing means may be provided.

Figure 2:
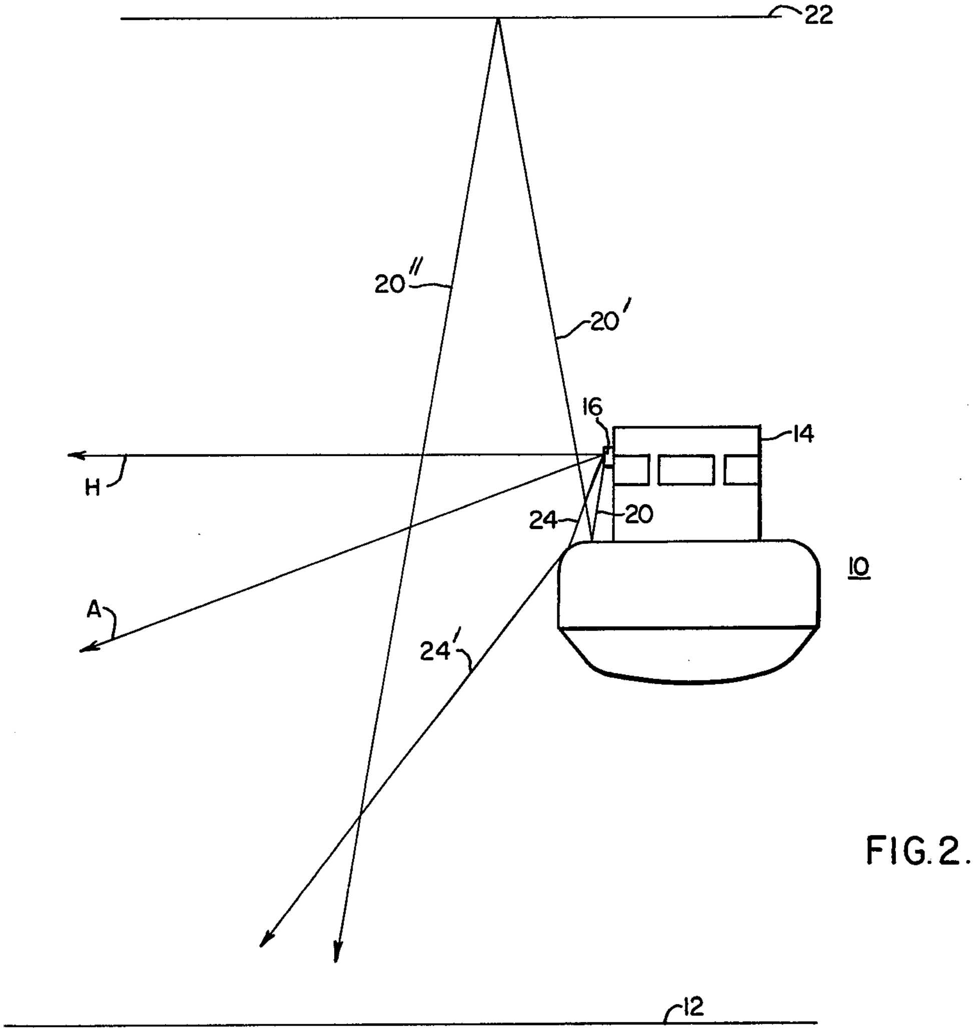
FIG. 2 is a front view of the vehicle illustrated in FIG. 1 and illustrates the typical problem encountered.

FIG. 2 illustrates a typical problem which can occur with such arrangement. For purposes of illustration, only one side-looking sonar transducer 16 is illustrated in FIG. 2 although another assembly could be placed on the port side of conning tower 14.

Line H is a horizontal line for use as a reference and line A is the acoustic axis of transducer 16. Maximum acoustic energy is propagated or received along the acoustic axis and the acoustic response of the transducer diminishes relative to the axis in accordance with a certain beam pattern.

When transducer 16 is suitably energized, an acoustic signal is projected and a portion of the acoustic signal as indicated by acoustic ray 20 is seen to hit the deck of the vessel 10 where the reflected ray 20' thereafter strikes the water surface 22 with the reflection 20'' therefrom eventually striking a target area on the bottom 12. Acoustic ray 24 is seen to glance off of the deck of vessel 10 whereby reflected acoustic ray 24' thereafter strikes the bottom 12. It is seen therefore that some of the acoustic signal will travel over a longer path due to undesirable reflections than the acoustic signal hitting a target area directly. If the reflected signal has enough energy when it hits the target area an erroneous presentation may result, with particular objects appearing on a display further away than they actually are.

Past certain depths, the acoustic energy reflected from the water surface 22 will have traveled over a relatively long path length through the water so that the acoustic energy is fairly dissipated by the time the energy hits the bottom 12. In such instance, the transducer will not receive reflected energy from the target area at a high enough level to display however reflections from the decks, as represented by acoustic ray 24', still may result in erroneous readings. The intensity of the acoustic ray 20 or 24 relative to the acoustic energy projected along the acoustic axis A can be seen in FIG. 3 illustrating, in polar coordinates, a typical beam pattern of a side-looking sonar transducer, although the principles herein discussed are applicable to other types of transducers.

Figure 3:
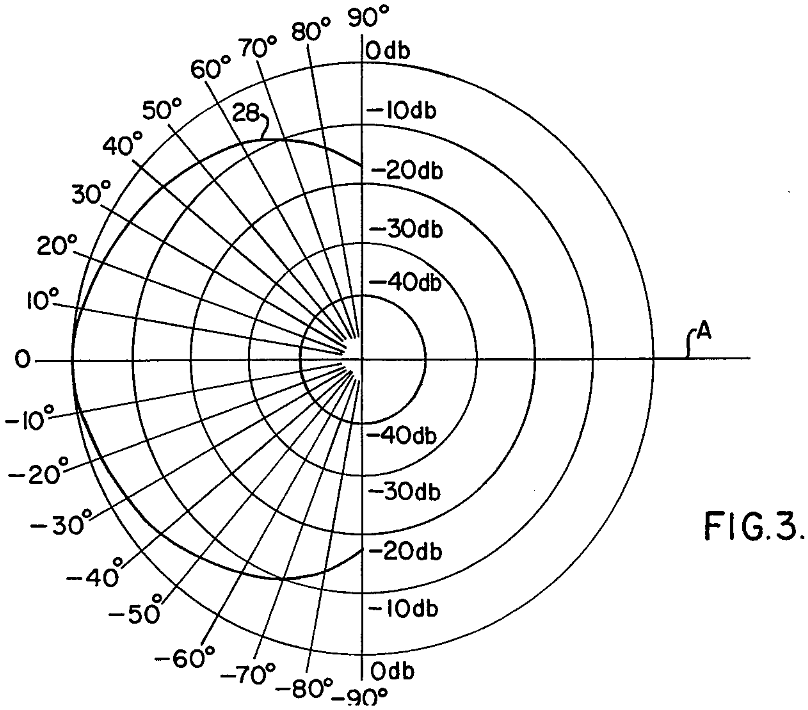
FIG. 3 is a polar plot of the beam pattern associated with the transducer on the vessel of FIGS. 1 and 2.

In FIG. 3, the concentric circles about the origin represent relative pressure and the radii represent angular orientation. The outermost circle represents normalized acoustic sound pressure. This maximum response is designated zero db (decibels). The next circle represents a magnitude of lesser sound pressure and is −10db or 10 db down. Subsequent concentric circles of diminishing radius represent proportionally lesser sound intensities. The beam pattern 28 for the particular transducer has a maximum (zero db) along the acoustic axis A and progressively diminishes in intensity with increasing angular deviation from the acoustic axis A. For example, at ± 20° off the acoustic axis A the acoustic response is approximately 2 db down; at ± 70° the response is 10 db down. The upper and lower right-hand quadrants have not been plotted since substantially no acoustic energy is projected or received in these directions.

The acoustic intensity, or sound pressure, of acoustic rays 20 and 24 relative to the acoustic axis A can be determined by reference to the beam pattern 28 of FIG. 3. With the beam pattern 28 tilted so that the acoustic axis A lines up with the acoustic axis A of FIG. 2 and lying in the plane of the paper, it is seen that acoustic ray 20 lies at an angle of approximately −60° and acoustic ray 24 at an angle of approximately −50°. According to the beam pattern 28, the intensity at an angle of −60° is approximately 8 db down and at −50° the intensity is approximately 6 db down. Although the intensity is not maximum, it is relatively close to maximum so that sufficient acoustic energy could be projected (or received) along those angles resulting in a possible erroneous display.

Figure 4:
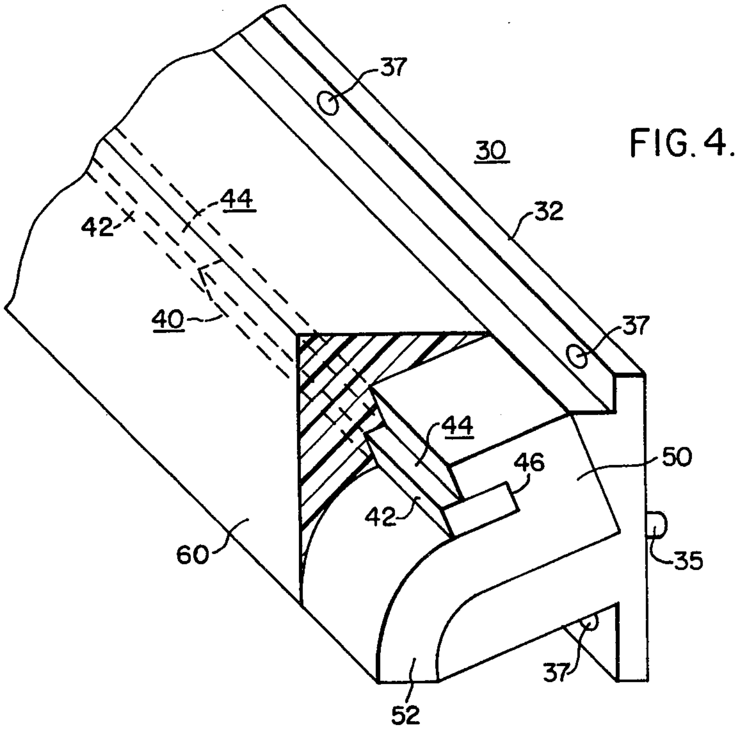
FIG. 4 illustrates one embodiment of the present invention.

The present invention eliminates or substantially reduces this undesirable operation by modifying the beam pattern to reduce the off axis response over a predetermined zone, and to this end, reference should be made to FIG. 4.

Transducer 30 has mounting means 32 for mounting on a carrier, such as in FIG. 1. Projections 35 fit into prealigned holes on the carrier for proper orientation of the transducer and the unit is secured by fastening means through apertures 37.

The transducer includes transducing means 40 having an active surface 42 for transmitting and/or receiving acoustic energy. For clarity, the electrode means generally provided for such transducer are not shown, but are well known to those skilled in the art. In the embodiment illustrated, the transducer is a side-looking sonar transducer whose active surface is liable to have a length of greater than 100 λ, where λ is the wavelength of the operating frequency in the medium in which the transducer operates. One example of a transducing means which may be utilized is barium titanate and which is relatively brittle. Accordingly, the transducing means is generally made up of a plurality of elements 44 arranged end to end along a straight or curved line.

When supplied with suitable electrical energy, not only does the active surface 42 radiate acoustic energy but the rear surface 46 also tends to radiate acoustic energy. In order to absorb this rearwardly projected acoustic energy there is provided an acoustic absorbing material 50 having an acoustic impedance substantially equal to that of the surrounding medium in which the apparatus operates. A side-looking sonar transducer having such acoustic absorbing material is the subject matter of U.S. Pat. No. 3,359,537 issued Dec. 19, 1967. In that patent, the sound absorbing material surrounds the rear and extends up the side surfaces of the active element to a position just short of the front active surface. In the present invention, there is provided acoustic absorbing material of the type described which is positioned relative to the active surface 42 so as to absorb a portion of forwardly projected (or received) acoustic energy to modify the transducer beam pattern so as to reduce the off axis response over a predetermined zone forward of the active surface. In FIG. 4, a portion 52 of the acoustic absorbing material 50 extends beyond the active surface 42.

Figure 5:
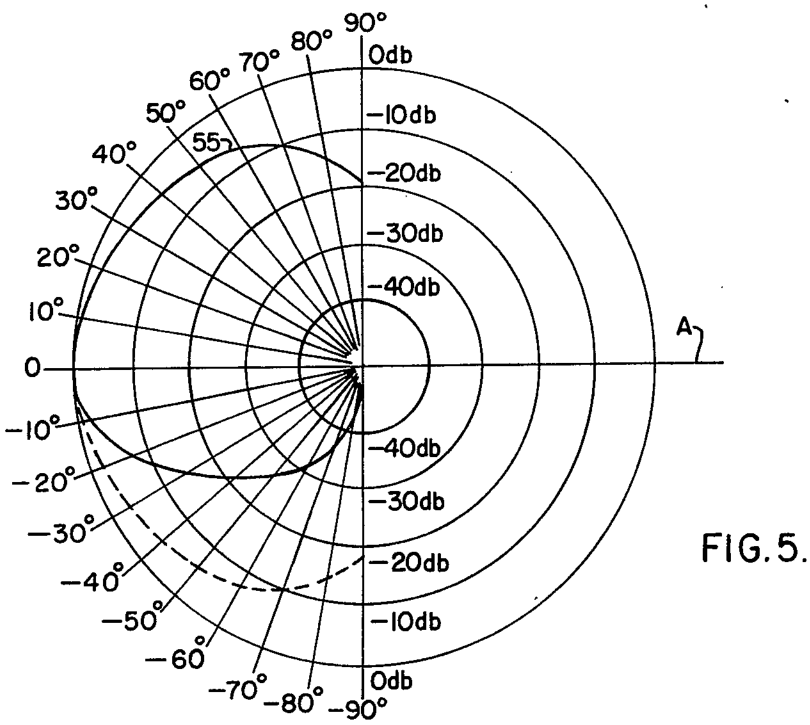
FIG. 5 is a polar plot of the beam pattern for the transducer of FIG. 4.

The portion 52 of acoustic absorbing material has the effect of diminishing the acoustic response as illustrated in FIG. 5 wherein the beam pattern 55 shown in solid line is the beam pattern for the transducer of FIG. 4 and for comparison purposes the previous beam pattern illustrated in FIG. 3 is reproduced in dotted line. Only the lower left quadrant of the beam pattern has been modified. Modification of the beam pattern in the upper left quadrant could also be accomplished by providing acoustic absorbing material which extends past the active surface 42 at the upper portion thereof.

In the example given in FIG. 2, the acoustic energy projected at an angle of −60°, as represented by acoustic ray 20, was approximately 8 db down. With the arrangement illustrated in FIG. 4, and with reference to beam pattern 55 of FIG. 5 it is seen that the response at this same angle is approximately 32 db down, a significant reduction in response. At −50° as represented by acoustic ray 24 of FIG. 2, the acoustic response was approximately 6 db down. The arrangement of FIG. 5 provides a resulting beam pattern wherein the response is approximately 28 db down. These significant reductions in response will insure that acoustic energy projected at negative angles greater than that represented by acoustic ray 24 will be of such reduced strength that the energy would be dissipated by the time it hit the target area or if not dissipated, would be undetectable upon reception. Similarly, with the beam pattern 55, acoustic reflected from the target area will have little or no effect upon the operation if received from this same zone relative to the acoustic axis.

Various acoustic absorbing materials may be utilized, depending upon the frequency of operation. For a typical side-looking sonar transducer the acoustic absorbing material 50 may be a butyl rubber, and to aid in further absorption of acoustic energy, the butyl rubber may have dispersed therein aluminum particles. The transducer 30 is completed with the provision of a potting material 60 contacting and covering the acoustic absorbing material and exposed portions of elements 44 to protect the apparatus from the effects of sea water. In order to preclude diffraction producing discontinuities, the potting material 60 should have the same acoustic impedance as that of the medium in which the apparatus operates.

I claim:

1. Transducer apparatus comprising:

a. transducing means having an active surface for transmitting and/or receiving acoustic energy;

b. said transducing means having associated therewith a certain beam pattern having a direction of maximum acoustic response and wherein acoustic response diminishes relative to said maximum as the angular displacement from said maximum is increased positively or negatively, and in accordance with said beam pattern; and c. acoustic absorbing material having an acoustic impedance substantially equal to that of the medium in which said apparatus operates and positioned relative to said active surface to absorb a portion of forwardly projected and/or received acoustic energy to modify said beam pattern to reduce the response over a predetermined zone forward of said active surface and angularly displaced from said direction of maximum response.

2. Apparatus according to claim 1 wherein:

a. said transducing means includes an active element having in addition to said active surface, a rear and side surface;

b. said acoustic absorbing material extending around said rear and up said side surfaces and projecting forwardly of said active surface, along at least one of said side surfaces.

3. Apparatus according to claim 1 wherein:

a. said transducing means includes a plurality of active elements arranged end to end along a line.

4. Apparatus according to claim 2 which includes:

a. a potting material having an acoustic impedance substantially equal to that of the medium in which said apparatus operates;

b. said potting material contacting and covering said acoustic absorbing material and the exposed portion of said active element.

* * * * *